(12) United States Patent
Ikeda

(10) Patent No.: US 6,868,017 B2
(45) Date of Patent: Mar. 15, 2005

(54) INTEGRATED CIRCUIT DEVICE

(75) Inventor: Kenji Ikeda, Tokyo (JP)

(73) Assignee: IP Flex Inc., Tokyo (JP)

(*) Notice: Subject to any disclaimer, the term of this patent is extended or adjusted under 35 U.S.C. 154(b) by 15 days.

(21) Appl. No.: 10/363,885

(22) PCT Filed: Jul. 11, 2002

(86) PCT No.: PCT/JP02/07076

§ 371 (c)(1),
(2), (4) Date: Jul. 7, 2003

(87) PCT Pub. No.: WO03/007155

PCT Pub. Date: Jan. 23, 2003

(65) Prior Publication Data

US 2004/0015613 A1 Jan. 22, 2004

(30) Foreign Application Priority Data

Jul. 12, 2001 (JP) ......................................... 2001-212545

(51) Int. Cl.[7] .............................................. G11C 16/04
(52) U.S. Cl. .............................. 365/189.05; 365/189.08
(58) Field of Search ....................... 365/189.05, 189.08, 365/52; 326/38

(56) References Cited

U.S. PATENT DOCUMENTS

| | | | | |
|---|---|---|---|---|
| 6,172,521 B1 | * | 1/2001 | Motomura ................... | 326/40 |
| 6,417,691 B1 | * | 7/2002 | Goodman et al. ............ | 326/41 |
| 6,438,737 B1 | * | 8/2002 | Morelli et al. ................ | 716/16 |

FOREIGN PATENT DOCUMENTS

| | | |
|---|---|---|
| JP | 64-9548 | 1/1989 |
| JP | 1-273132 | 11/1989 |
| JP | 11-143774 | 5/1999 |
| JP | 2002-163150 | 6/2002 |

OTHER PUBLICATIONS

Compton, K., Reconfigurable Computing: A Survey of Systems and Software. ACM Computing Surveys. Jun. 2002, vol. 34, No. 2, pp. 171–210.

Kim, H.S., et al., A Reconfigurable Multi–function Computing Cache Architecture. Proceedings of ACM/SIGDA International Symposium on Field Programmable Gate Arrays. 2000, pp. 85–94.

Ranganathan, P., et al., Reconfigurable Caches and their Application to Media Processing. Proceedings of the 27th International Symposium on Computer Architecture (ISCA–27). Jun. 2000, pp. 214 and 224.

* cited by examiner

*Primary Examiner*—Anh Phung
(74) *Attorney, Agent, or Firm*—Marshall, Gerstein & Borun LLP

(57) ABSTRACT

In an integrated circuit device that includes a first memory that is capable of inputting data into and/or outputting data from a second memory and a processing unit in which at least part of at least one data flow is changeable, the processing unit includes, in addition to a data processing section that processes data that is inputted from and/or outputted to the first memory, a first address outputting section that outputs a first address of data that is inputted and/or outputted between the first memory and the data processing section and a second address outputting section that outputs a second address of data that is inputted and/or outputted between the first memory and the second memory. By using part of the processing unit, where a data flow can be changed or reconfigured, for configuring a circuit that controls the memories, a cache memory system that is optimal for the processing executed by the integrated circuit device can be configured in the integrated circuit device.

40 Claims, 7 Drawing Sheets

INTEGRATED CIRCUIT DEVICE

TECHNICAL FIELD

The present invention relates to an integrated circuit device in which data flows can be reconfigured.

RELATED ART

When data and/or instructions (hereinafter referred to as "data" where there is no particular need to distinguish between "instructions" and "data"), which are stored in a memory, such as a RAM, a ROM, or a magnetic disc, are processed by a CPU or the like, a high speed memory called a "cache" or "cache memory" that has a comparatively small capacity is used and the access speed for the data is improved by utilizing the temporal locality and/or spatially locality of the data. Accordingly, in an integrated circuit device such as a VLSI, a system LSI, or a system ASIC where a processor or a processor core is incorporated, a cache system comprising a cache memory and an MMU (Memory Management Unit) for controlling the cache memory is also incorporated.

When a cache memory is used, an MMU and a TLB (Translation Look-Aside Buffer) are used, so that when the data corresponding to a virtual or logical address outputted from the CPU core is present in the cache memory, data is inputted and outputted between the cache memory and the CPU core. When the data is not present in the cache memory, the virtual address is converted into a physical address by the MMU and the TLB and an input/output is generated for an external memory, and the data in the cache memory is also updated. In this way, due to the cache control mechanism that comprises the MMU and the like, the cache memory is constructed as a device that appears to be transparent to the software that is executed by the CPU core. Accordingly, software can be developed so as to operate based on virtual addresses that do not depend on hardware, which makes it possible to reduce the time taken and cost incurred by software development and design. Also, the same software can be run on different hardware, which means that software resources can be used effectively.

When the data at the virtual address outputted from the CPU core is not present in the cache memory, which is to say, when a "hit" does not occur for the cache memory, an input/output process occurs for an external memory. When the hit rate of the cache memory is low, the cache memory becomes merely an overhead that detrimentally affects the execution time of programs. In order to improve the hit rate, studies are being performed into techniques such as separating the cache into an instruction cache and a data cache, constructing the cache with a hierarchical structure, or prefetching data mechanically and/or using software.

However, when applying the cache that is separated into an instruction cache and a data cache, if instructions and data are simultaneously present in one block, it becomes difficult to handle the instructions and the data. For example, rewriting instructions may cause obstruct to software processing. Also, in software where instructions and data are not accessed equally, there is no improvement in efficiency by simply separating the cache. For example, when the accesses to data are sporadic, the usage efficiency of the data cache is low, so that there is the possibility of this becoming an overhead.

A hierarchical cache is effective when there are large differences in access time and storage capacity between the cache and the external memory. However, when the cache is constructed hierarchically, there is an inevitable rise in the number of accesses to the memory, so that there is always the possibility of overheads depending on conditions such as the structure of the software and the input/output media for the data being processed.

Even when prefetching is performed, penalties due to branch instructions or the like cannot be avoided. In some kinds of software, for example an arithmetical calculation program, in which many accesses are preformed to array elements and the element to be accessed can be predicted in advance, the number of the cache penalties can be reduced using prefetch instructions, though CPU time is expended by the execution of such prefetch instructions and this technique can be used effectively for limited range of software.

In this way, the above techniques are each capable of raising the hit rate of a cache memory in cases where conditions, such as the software executed by a CPU and the media on which data is stored, match with the selected method using the cache memory. However, since cache memory is hardware that is disposed in an intermediate position between the CPU and the external memory, when there are differences in the processing content of the software to be executed or in the hardware environment that stores the data to be processed by this software, this can cause problems such as the predicted cache efficiency not being obtained and conversely in overheads being produced, which increases the execution time of the processor. For a processor that is dedicated to a certain application, it may be possible to provide an optimal cache memory system. However, for a processor that is designed to have a certain degree of general-purpose applicability, to ensure that the cache memory is worthwhile, it is necessary to provide a cache memory system that does not cause many overheads, even if the effectiveness of the cache memory system itself is not especially high. Accordingly, even if a cache memory system is provided, the improvement in performance is not especially large.

It is an object of the present invention to provide an integrated circuit device including a memory that can be used as a cache with the highest possible efficiency for the processing content of software executed by a processor and the hardware environment. It is a further object of the invention to provide an integrated circuit device including a control function that can use a memory as a cache with the highest possible efficiency. It is yet another object of the invention to provide an integrated circuit device that can execute a variety of software more efficiently.

DISCLOSURE OF THE INVENTION

In recent years, processing units in which the configuration of a data path or a data flow can be at least partially changed have been introduced. An FPGA (Field Programmable Gate Array) is an integrated circuit device in which logic elements or logic blocks of the same construction whose logic can be changed are laid out in an array, with it being possible to change the interconnects between these elements or blocks so as to change the configuration or construction of data paths. Research is also being performed into integrated circuit devices where it is possible to change the configuration of data paths using medium-scale basic functional units of the same construction that perform a variety of processes according to instruction sets. The applicant of the present invention has developed a processing unit including (i) a plurality of types of special-purpose processing elements, each type of special-purpose element having internal data paths suited to respectively different special-purpose processing, and (ii) sets of wires for connecting these special-purpose processing elements. In this invention, a circuit that controls a cache memory is configured using a part of these kinds of processing unit where the data flows can be changed or reconfigured.

This is to say, an integrated circuit device according to the present invention includes a first memory for inputting data into and/or outputting data from a second memory and a processing unit in which at least one data flow is formed and at least part of at least one data flow is changeable, the processing unit including a data processing section that processes data that is inputted from and/or outputted to the first memory, a first address outputting section that outputs a first address of data that is inputted and/or outputted between the first memory and the data processing section, and a second address outputting section that outputs a second address of data that is inputted and/or outputted between the first memory and the second memory. By constructing a first address outputting section and a second address outputting section using part of the processing unit where the data flows can be changed, using the hardware configuration of the data processing section or the software executed in the data processing section, it is possible to change the data flow of the first address outputting section or the second address outputting section and to control the outputs of these sections. Accordingly, a cache system that is optimal for the processing executed by an integrated circuit device can be configured in the integrated circuit device. Alternatively, it is possible to configure a control circuit for a cache memory in the integrated circuit device so that a cache system can be optimally controlled for the processing executed by the integrated circuit device.

With the integrated circuit device of the present invention, the first memory that is used as the cache memory can be passively controlled by a second address in a second memory. The second address includes not only a physical address of data in the second memory but also a logical address or virtual address that can be converted into the physical address. Through such control, it becomes possible to make the first memory is transparent to the second memory and/or the data processing section. In addition, according to data or a signal from the data processing section and/or the first address outputting section, the second address outputting section can actively control input and outputs of data independently of both the data processing section and the first address outputting section. It is also possible to control input/output operations between the first memory and second memory in parallel with the operations of the data processing section and the first address outputting section. Accordingly, it is possible to configure a cache system where the accessed location of data used by the data processing section and first address outputting section is determined by the second address outputting section, so that it is possible to construct not simply a conventional cache that is transparent for a CPU but a cache that controls the processing in the processing unit.

This is to say, conventional cache architecture is constructed so as to provide a uniform, transparent interface that can improve the average execution speed for software that operates on a processing structure of a standardized hardware construction, such as a CPU core or a DSP core. On the other hand, in the integrated circuit device of the this invention, a data processing section that acts as a core is provided by using an architecture such as an FPGA in which the construction of a data path itself can be changed, and in accordance with this, the cache construction can be dynamically changed to an optimal construction for the configuration in the data processing section and the software executed by the configuration of the data processing section. Accordingly, there is no need for always uniformity or transparency, and an interface or service that is completely different to a conventional cache can be provided for a data processing section that is the core or execution unit.

In this way, with the integrated circuit device of the present invention, the first memory can be used with the highest possible efficiency as a cache in accordance with the hardware environment and the processing content of the software executed by the processing unit. A cache system that can produce a higher hit rate can be constructed when a variety of software is executed, so that it is possible to provide an integrated circuit device where input/outputs for a cache memory do not cause overheads when a variety of software is executed.

As one example, when the address in the second memory of data to be executed by the data processing section is known, it is possible to prefetch data using the remaining amount of space in the first memory by the second address outputting section independently. Accordingly, data can be prefetched into the second memory that is used as a cache by hardware or by software that controls the second address outputting section without consuming processing time of the data processing section. In this example, an address in a first memory, that includes not only a physical address in the first memory but also a virtual address or logical address that can be converted into the physical address in the first memory, is outputted from the first address outputting section as the first address, and an address in a second memory, that includes not only a physical address in the first memory but also a virtual address or logical address that can be converted into the physical address is outputted from the second address outputting section as the second address. In the data processing section, hardware or software is configured so that processing advances using addresses in the first memory that acts as a cache memory.

In addition, it is preferable for the second address outputting section to be capable of operating asynchronously with, which is to say independently of, the data processing section and/or the first address outputting section. By doing so, data can be prefetched by parallel processing independently of the data processing section. To make it possible to process inputs and outputs for the second memory independently and in parallel, it is preferable to provide the first memory with a plurality of storing sections, such as a plurality of memory banks, for which inputs and outputs can be performed asynchronously or independently.

It is also possible to configure the second address output section so as to output the second address based on data in the first memory, by the second address outputting section alone or by a combination of the second address outputting section and the data processing section. By this configuration, data processing can be executed by indirect addressing with no limitations whatsoever.

It is preferable for the first memory that operates as a cache to include a first input memory that stores data to be inputted into the data processing section and a first output memory that stores data that has been outputted from the data processing section. By doing so, inputs and outputs of data for the data flows formed in the data processing section can be controlled independently. An address in the first memory is outputted from the first address outputting section, but when there is no space for storing the data corresponding to the first address or there is no data corresponding to the first address in the first memory, a failure may occur in the processing of a data flow formed in the data processing section. For this reason, it is preferable to provide a first arbitrating unit that manages inputs and/or outputs between the first memory and the data processing section.

The first arbitrating unit can be provided with a function that outputs a stop signal to the data processing section when the conditions for input into or output from the data processing section are not satisfied, such as when there is no data corresponding to the first address or when there is no space for storing data corresponding to the first address. The data processing section can also be provided with a function for stopping the processing of at least one data path or data flow that is configured in the data processing section according to the stop signal, so that the data path or data flow can be turned on and off by the first arbitrating unit. It is possible to easily realize control that has a data path or data flow that is formed in the data processing section operate after first waiting until the data to be processed is prepared.

If the first memory includes a first input memory and a first output memory, it is preferable to provide a first input arbitrating unit that manages data transfers from the first input memory to the data processing section and a first output arbitrating unit that manages data transfers from the data processing section to the first output memory as the first arbitrating unit. It is possible to control data flows formed in the data processing section independently from both the input side and the output side.

When the first memory includes a plurality of storage sections that are capable of independent inputs and outputs, the first arbitrating unit can be provided with a function that manages the plurality of storage sections independently. In this case, each of the plurality of data flows formed in the data processing section can be controlled independently by the first arbitrating unit according to the state of the corresponding storing section. On the other hand, the first arbitrating unit can be provided with a function that manages a plurality of storing sections relationally or with the storing sections being associated with one another. By doing so, it is easy to realize control that has data flows formed in the data processing section give priority to processing data that is inputted into a predetermined storing section from an external memory and has outputs from data flows outputted with priority to the external memory via a predetermined storing section.

In addition, when a plurality of data flows can be configured in the data processing section, it is preferable to provide a plurality of first memories and to have a pair of first and second address outputting sections configured in the processing unit corresponding to each first memory. It becomes possible to construct a multilevel or hierarchical cache by appropriately configure the data processing section and the first address outputting section. Also, depending on the program executed by the integrated circuit device, a plurality of first memories can be divided and used as an instruction cache and a data cache, and when a plurality of data processing sections are provided, the plurality of first memories can be used for caching the data processed by these data processing sections and the data cached by the respective first memories can be appropriately controlled by the second address outputting section.

When a plurality of second address outputting sections are provided, a second arbitrating unit that manages inputs and outputs between the second memory and the plurality of first memories should preferably be provided and the second address should preferably be supplied to the second arbitrating unit. When the second memory is an external memory, the integrated circuit device of the present invention can access the external memory in the same way as a conventional integrated circuit device. Also, in an integrated circuit device where the second memory is formed on the same chip, it is possible to construct the cache memory hierarchically by providing a third address outputting means that outputs a third address of the data that is inputted and/or outputted between a third memory and the second memory so as to make it possible to input and/or output data between the second memory and the third memory. This is to say, if the third memory is an external memory, the cache memory can be composed of the first and second memories. This third address outputting means may be a conventional cache control mechanism such as an MMU, though it is also possible for the third address outputting means to have a similar construction to the second address outputting section. This is also the case when control is performed for a fourth or higher level of memory (which is not restricted to ROM and RAM and may include various types of storage media such as disks).

A processing unit in which the data flow can be changed or reconfigured may include a type of processing unit that includes a plurality of logic elements of the same type whose functions can be changed and a set of wires for connecting these logic elements, which is an FPGA above, and another type of processing unit in which the data path arrangement or data flows can be changed using medium-scale basic functional units of the same construction. It is also possible to use a further different type of processing unit that includes (i) a plurality of types of special-purpose processing elements, each type of the special-purpose processing element including internal data paths suited to respectively different special-purpose processing and (ii) sets of wires for connecting these special-purpose processing elements. With this type of reconfigurable processing unit, it is possible to incorporate special-purpose processing elements including internal data paths that are suited to outputting addresses, so that the processing efficiency for generating addresses is increased and the processing speed can be further improved. Also, since there is a reduction in the number of surplus circuit elements, a reduction can be made in the number of elements that are selected to change the data flow, the AC characteristics can be improved, and an increase is also made in the space efficiency.

Accordingly, by having a control unit, which indicates changes to at least part of a data flow in the processing unit, execute a process that instructs the processing unit to construct the data processing section, first address outputting section, and second address outputting section mentioned above, a data flow can be flexibly and dynamically changed in a short time. This makes it possible to provide a compact, economical integrated circuit device that includes a flexible cache system.

To facilitate changes in the data flows in the processing unit, it should preferably be possible to, in addition to change the connections between the special-purpose processing elements, to include (i) means that select parts of the internal data paths of the special-purpose processing elements and (ii) configuration memories that store selections of the internal data paths. The control unit can reconfigure data flows by rewriting the content of the configuration memories or by indicating changes to at least part of a data flow in the processing unit. If the processing unit includes special-purpose processing elements, the control unit can indicate changes in the data flow in the data processing section, the first address outputting section, or the second address outputting section asynchronously and independently. While data is being inputted into or outputted from the first memory, the special-purpose processing elements that compose the data processing section and/or first address outputting section can be used to configure a data flow for another purpose. Conversely, while processing is being executed by the data processing section, the special-purpose processing elements of the second address outputting section can be used to control a different memory or be used for a different purpose, so that the resources of the processing unit can be flexibly and efficiently utilized.

By incorporating a code memory for storing program code that has the control unit perform the above processing, it becomes possible to construct an integrated circuit device, such as a single-chip system LSI. Accordingly, it becomes possible to provide integrated circuit devices with improved execution speed where a cache or cashes are used efficiently for a variety of types of software without causing overheads. It is also possible to provide a processing unit whose data flows can be reconfigured as a separate chip, as a processor core, or as a chip in which the first memory used as the cache memory is also incorporated. In this way, the present invention can be embodied in a variety of ways, with processing devices that correspond to such embodiments also being included within the scope of the present invention.

BEST MODE FOR CARRYING OUT THE PRESENT INVENTION

Figure 1:
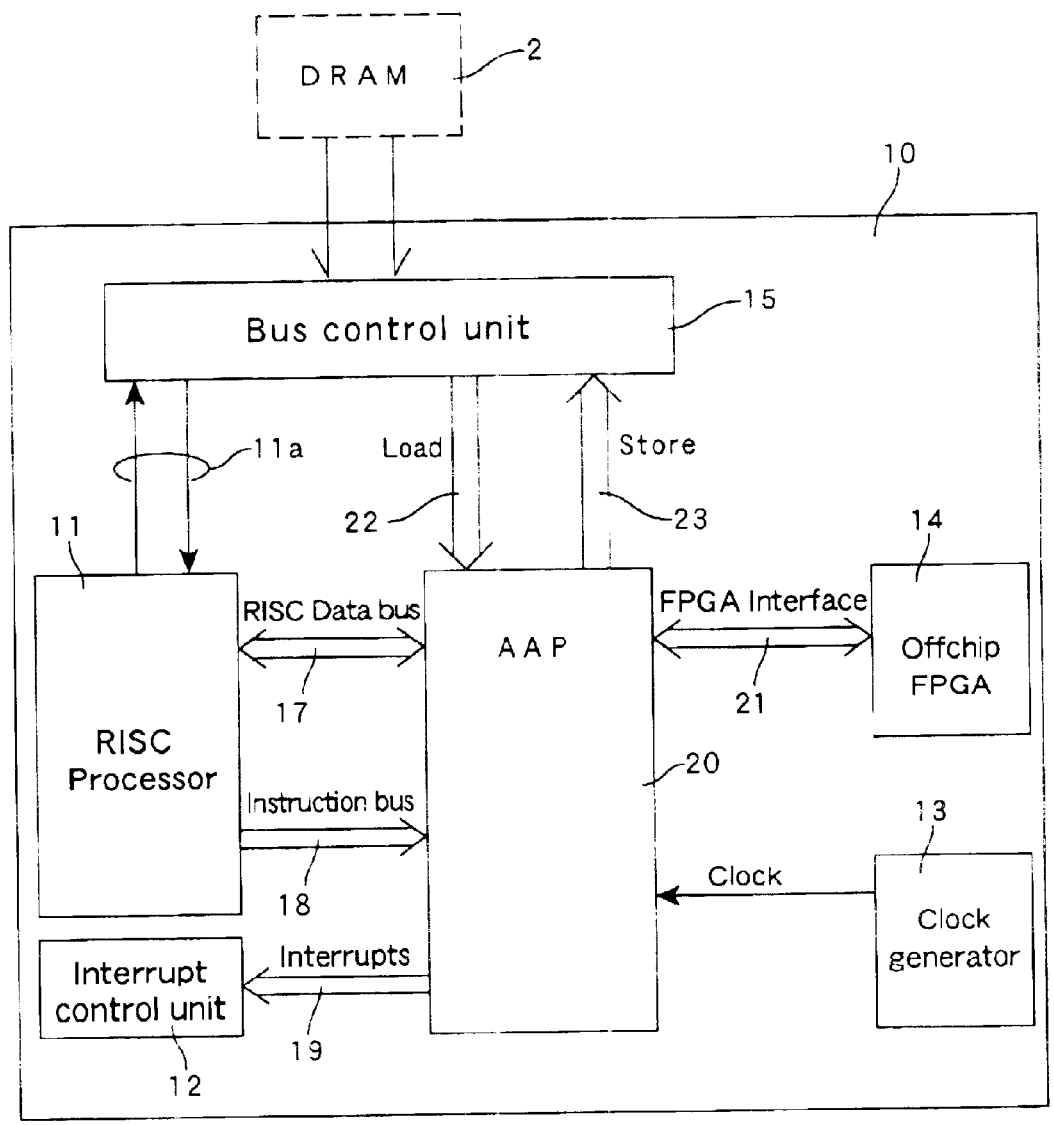
FIG. 1 is a block diagram showing an arrangement of an integrated circuit device according to an embodiment of the present invention.

The following describes the present invention with reference to the attached drawings. FIG. 1 shows the outline configuration of a system LSI 10 according to the present invention. This LSI 10 is a data processing system that includes a processor unit 11, an AAP (Adoptive Application Processor) portion or unit (hereinafter AAP) 20, an interrupt control unit 12, a clock generating unit 13, an FPGA unit 14, and a bus control unit 15. The processor unit 11 (hereinafter "basic processor" or "processor") that has a general-purpose construction and performs general purpose processing, including error handling, based on instruction sets that are provided by a program or the like. In the AAP unit 20, data flows or virtual data flows that are suited to special-purpose data processing are variably formed by a plurality of operation or logical elements that are arranged in a matrix. The interrupt control unit 12 controls interrupt handling for interrupts from the AAP 20. The clock generating unit 13 supplies an operation clock signal to the AAP 20. The FPGA unit 14 further improves the flexibility of the operation circuits that can be realized by the LSI 10. The bus control unit 15 controls inputs and outputs of data to and from the periphery. The FPGA unit 14 is an interface for an FPGA chip that is disposed in the periphery of the LSI 10 and is referred to hereinafter as the "offchip FPGA" and the "FPGA". In the LSI 10 that is the integrated circuit device of the present invention, the basic processor 11 and the AAP 20 are connected by a data bus 17 on which data can be exchanged between the basic processor 11 and the AAP 20 and an instruction bus 18 for enabling the basic processor 11 to control the configuration and operation of the AAP 20. Also, interrupt signals are supplied from the AAP 20 to the interrupt control unit 12 via a signal line 19, and when the processing of the AAP 20 has ended or an error has occurred during such processing, the state of the AAP 20 is fed back to the basic processor 11.

The AAP 20 and the FPGA 14 are connected by a data bus 21, so that data is supplied from the AAP 20 to the FPGA 14, where processing is performed, and the result is then returned to the AAP 20. Also, the AAP 20 is connected to the bus control unit 15 by a load bus 22 and a store bus 23, and so can exchange data with a data bus on the outside of the LSI 10. Accordingly, the AAP 20 can receive an input of data from an external DRAM 2 or another device and output a result produced by processing this data in the AAP 20 back to the external device. The basic processor 11 can also input and output data to and from an external device via a data bus 11a and the bus control unit 15.

Figure 2:
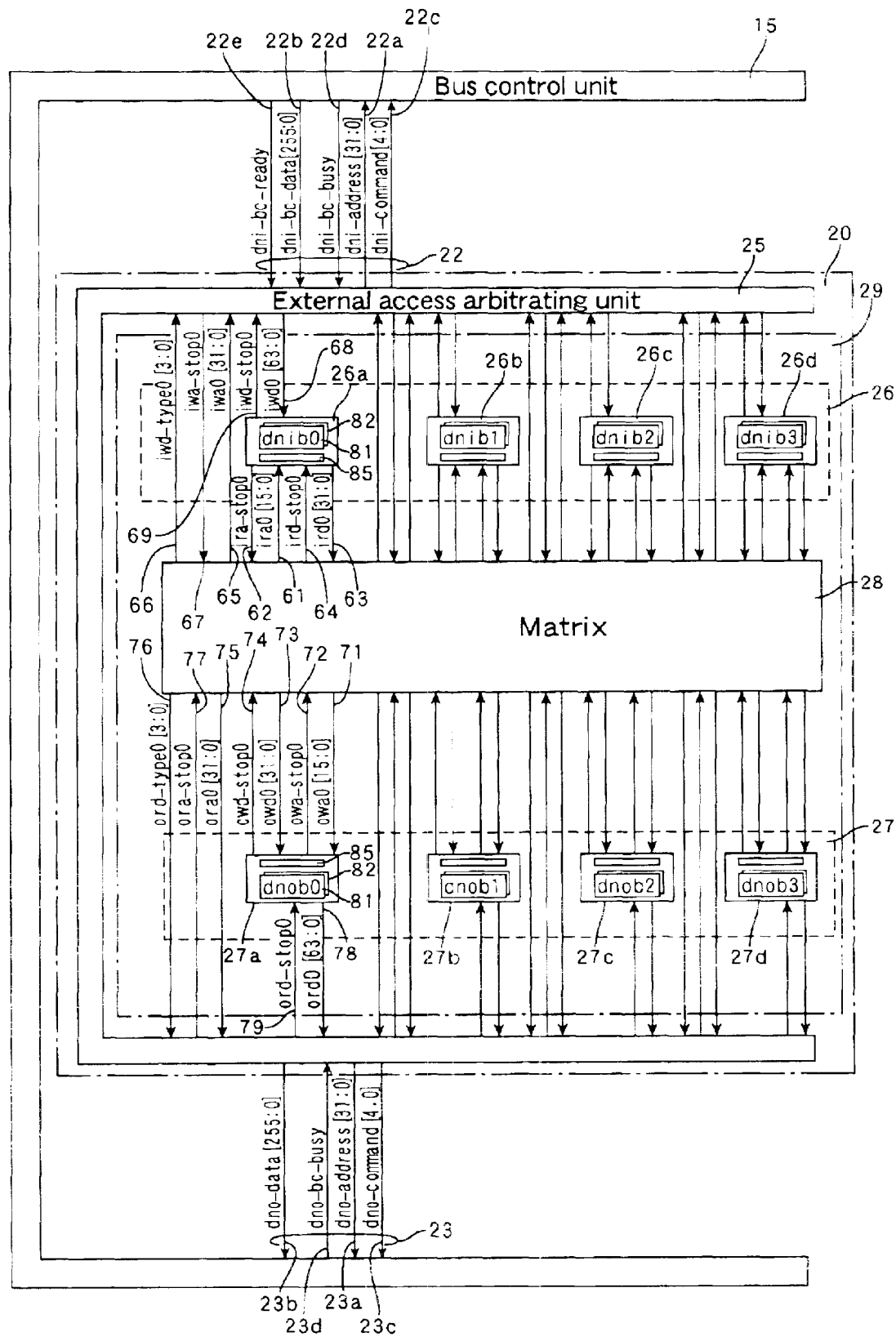
FIG. 2 shows an arrangement of an AAP that is a processing unit.

FIG. 2 shows an outline of the AAP unit 20. The AAP unit 20 of the present embodiment comprises a matrix unit or portion 28 in which a plurality of logical blocks, logical units, and/or logical elements (hereinafter "elements") that perform arithmetical and/or logical operations are arranged in a matrix, an input buffer 26 that supplies data to the matrix unit 28, and an output buffer 27 that stores data that has been outputted from the matrix unit 28. The input buffer 26 and output buffer 27 respectively comprise four small-capacity input memories (RAMs) 26a to 26d and four output memories (RAMs) 27a to 27d. The AAP 20 further comprises an external access arbitrating unit (second arbitrating unit) 25 that controls data input/output operations between (i) the bus control unit 15 and (ii) the input buffer 26 and output buffer 27 that comprise a plurality of memories.

The input RAMs 26a to 26d and output RAMs 27a to 27d of the present embodiment each functions as 1 Kbyte dual-port RAMs, and each can be used as dual-bank RAMs 81 and 82 that are 64 k bits wide and 512 bytes deep. Accordingly, by using different banks for inputs and outputs for the memory, it is possible to process input and output operations independently. An arbitrating unit 85 (first arbitrating unit) that manages inputs into and outputs from the RAMs 81 and 82 is also provided and it is possible to check whether each bank is full or empty by counting the number of inputs and outputs.

In order to control the inputting and outputting of data into the input RAMs 26a to 26d and out of the output RAMs 27a to 27d, a plurality of types of control signals are exchanged between (i) the matrix unit 28 and (ii) the RAMs and the arbitrating unit 85. First, 16-bit input readout address data ("ira" or the "first address") 61 for controlling the data that is read out by the matrix unit 28 from the input RAMs 26a to 26d is outputted to each of the input RAMs 26a to 26d. The input readout address 61 is a logical or physical address in the input RAMs 26a to 26d. Also, an input readout address stop signal ("ira_stop") 62 for controlling the supplying of the address data 61 depending on the full and/or empty states is outputted from the arbitrating unit 85 of each of the input RAMs 26a to 26d to the matrix unit 28. The input readout address stop signal 62 is also outputted from the arbitrating unit 85 when the input conditions for the matrix unit 28 are not ready, such as when there is no data corresponding to the address data 61 supplied from the matrix unit 28.

In the matrix unit 28, a data flow or data flows that are formed in the matrix unit 28 are turned on and off by the stop signals 62. Accordingly, in the execution process that is performed after the data flows have been configured in the matrix unit 28, the execution of the processing defined by the data flows can be respectively controlled by the arbitrating units 85 of the input RAMs 26a to 26d. If the data that corresponds to the input readout address data 61 is not present in the input RAM 26, the processing of the data flow is placed into a wait state. Conversely, if the data that corresponds to the input readout address data 61 is present in the input RAM 26, 32-bit input readout data ("ird") 63 is supplied to the matrix unit 28, is processed by the configured data flow, and is outputted to one of the output RAMs 27. Also, a stop signal ("ird_stop") 64 that controls the input readout data 63 is outputted from the matrix unit 28 to each of the input RAMs 26a to 26d so that the reading out of data is stopped when the operation of the data flow in the matrix unit 28 has stopped due to a cause on the output side, for example.

The arbitrating unit 85 of each of the input RAMs 26a to 26d fundamentally controls each of the input RAMs 26a to 26d independently. Accordingly, the exchanging of data between the matrix unit 28 and the input RAMs 26a to 26d is controlled and executed separately for each of the input RAMs 26a to 26d, so that data flows that are formed in the matrix unit 28 corresponding to the input RAMs 26a to 26d are controlled independently. This is also the case for the output RAMs 27a to 27d that are described below. On the other hand, the arbitrating units 85 of the input RAMs 26a to 26d can connect by wiring between the input RAMs 26a to 26d or by wiring via the matrix unit 28, so that a plurality of input RAMs 26a to 26d can be managed relationally or associated with one another. By managing input RAMs 26a to 26d relationally, it becomes possible to assign a plurality of input RAMs to a data flow configured in the matrix unit 28. By attaching an order of priority to the plurality of input RAMs 26a to 26d using the arbitrating units 85, it is also possible to perform control that supplies data flows with data from RAMs with high priority.

Also, 32-bit input write address data ("iwa" or the "second address") 65, which controls the data to be read out from an external memory 2 via the bus control unit 15 and written in each of the input RAMs 26a to 26d, and a 4-bit control signal ("iwd_type") 66, which can indicate the data type, etc., of the input data, are outputted from the matrix unit 28 in the unit of each of the input RAMs 26a to 26d. The input write address data 65 and the control signals 66 that correspond to the respective input RAMs 26a to 26d are all outputted to the external access arbitrating unit 25. The input write address data 65 is a physical address in the RAM 2, which is an external memory, or a logical or virtual address that corresponds to the physical address in the RAM 2. In response to these addresses, stop signals ("iwa_stop") 67, each of that controls the output of the address data 65, are supplied from the external access arbitrating unit 25 to the matrix unit 28.

Furthermore, 64-bit input write data ("iwd") 68 that corresponds to the input write address data 65 supplied to the external access arbitrating unit 25 is respectively supplied from the arbitrating unit 25 to each of the input RAMs 26a to 26d, and a stop signal ("iwd_stop") 69 that controls the input write data 68 is supplied from each of the input RAMs 26a to 26d to the external access arbitrating unit 25.

In order to control outputs from the matrix unit 28, 16-bit output write address data ("owa" or the "first address") 71 for controlling data that is read out from the matrix unit 28 and written in each of the output RAMs 27a to 27d is outputted to each of the output RAMs 27a to 27d. This output write address data 71 is a logical or physical address in each of the output RAMs 27a to 27d. An output write address stop signal ("owa_stop") 72, which controls the supplying of the address data 71 based on full and/or empty states, is outputted from the arbitrating unit 85 of each of the output RAMs 27a to 27d to the matrix unit 28. This is to say, when the conditions for the reception of an output from the matrix unit 28 are not satisfied, the output write address stop signal 72 is outputted from the arbitrating unit 85. In the matrix unit 28, the data flows that are configured in the matrix unit 28 are turned on and off by the stop signals 72, thereby controlling the execution of the processing defined by the data flows. If there is space in the output RAM 27, 32-bit output write data ("owd") 73 is outputted from the matrix unit 28 together with the output write address data 71. A stop signal ("owd_stop") 74 that controls the output write data 73 is supplied from the arbitrating unit 85 of each of the output RAMs 27a to 27d to the matrix unit 28.

Also, 32-bit output readout address data ("ora" or the "second address") 75 for controlling data to be read out from each of the input RAMs 26a to 26d via the bus control unit 15 and written into the external memory 2 and a 4-bit control signal ("ord_type") 76 that can indicate the data type, etc., of this data are outputted from the matrix unit 28 in the unit of the output RAMs 27a to 27d. The output read address data 75 and the control signals 76 are all outputted to the external access arbitrating unit 25. The output read address data 75 is a physical address in the DRAM 2, which is an external memory, or a logical or virtual address that corresponds to the physical address in the DRAM 2. In response to this, a stop signal ("ora_stop") 77 that controls the outputting of the address data 75 is supplied to the matrix unit 28 from the external access arbitrating unit 25.

Furthermore, 64-bit output readout data ("ord") 78 is supplied together with the output readout address data 75 from each of the output RAMs 27a to 27d to the external access arbitrating unit 25, and a stop signal ("ord_stop") 79, which controls the output readout data 78, is supplied from the external access arbitrating unit 25 to each of the output RAMs 27a to 27d.

With the AAP unit 20 of the present embodiment, the input data 63 of the matrix unit 28 is supplied from the bus control unit 15, which is the interface for the external memory 2, via the plurality of input RAMs 26a to 26d and the external access arbitrating unit 25. Also, the output data 73 from the matrix unit 28 is supplied to the bus control unit 15, which is the interface for the external memory 2, via the plurality of output RAMs 27a to 27d and the external access arbitrating unit 25. The input RAMs 26a to 26d and the output RAMs 27a to 27d each have a dual-bank construction, so that (a) the processing between the input RAMs 26a to 26d, the output RAMs 27a to 27d, and the matrix unit 28, and (b) the processing between the input RAMs 26a to 26d, the output RAMs 27a to 27d, and the external access arbitrating unit 25, which is to say, the processing that involves the external RAM 2, can be executed independently and asynchronously in parallel.

Between the external access arbitrating unit 25 and the bus control unit 15, the load bus 22 and the store bus 23 each comprising a 32-bit address bus and a 256-bit data bus are arranged so that data can be inputted and outputted at high speed in block units. The input address signal 22a and the output address signal 23a are transmitted via the address bus, and the input data 22b and the output data 23b are outputted via the data bus. Signal lines that transmit the 5-bit commands 22c and 23c, signal lines that transmit busy signals 22d and 23d of the bus control unit 15, and a signal line that transmits a ready signal 22e of the bus control unit 15 are also provided.

Figure 3:
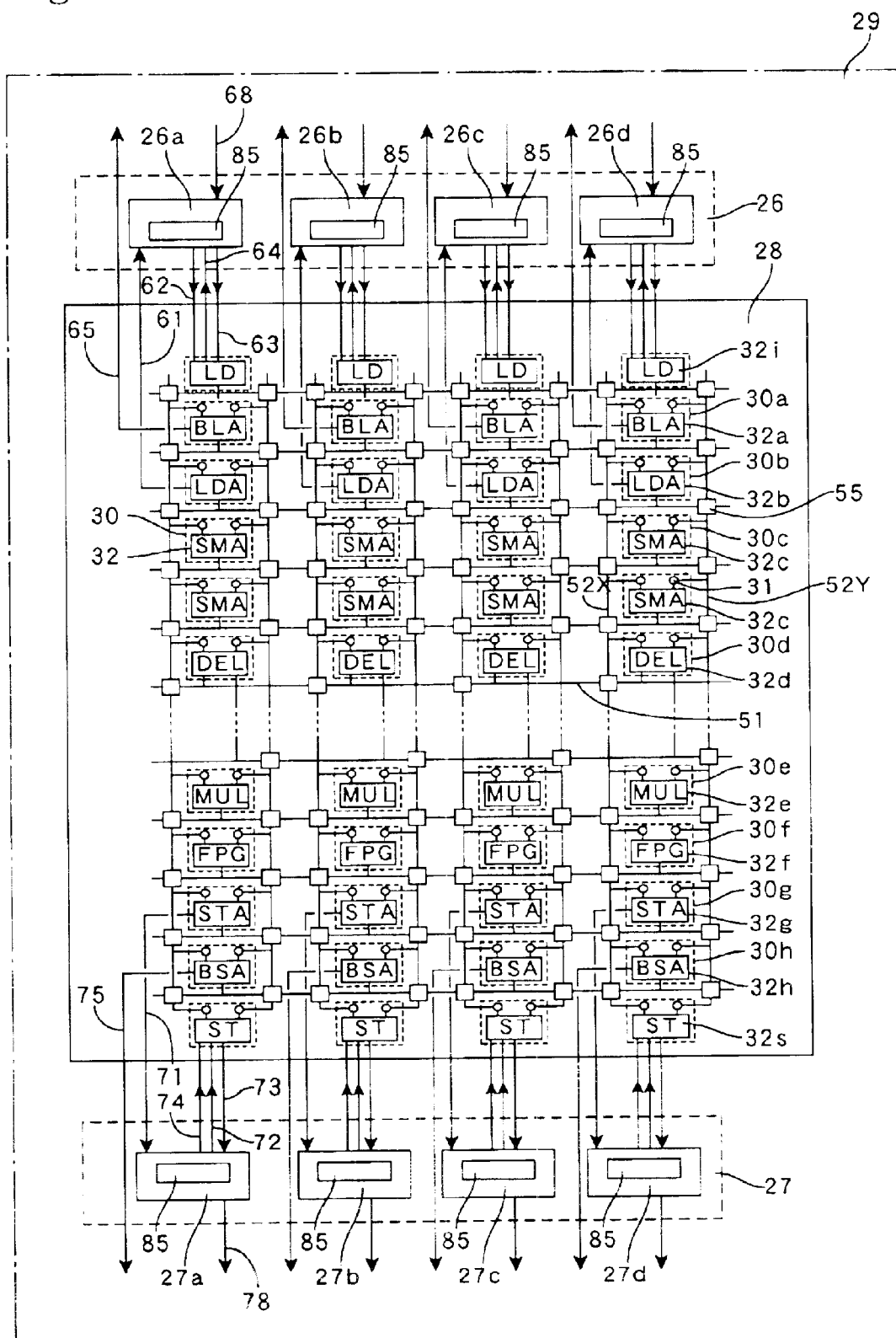
FIG. 3 shows an arrangement of the matrix unit.

FIG. 3 shows an arrangement of a partial configuration 29 of AAP 20 comprising the matrix unit 28 and the small-capacity RAMs 26a to 26d and 27a to 27d of the present embodiment. In the present invention, the matrix unit 28 is a system corresponding to the processing unit in which data paths or data flows are reconfigurable or changeable. The matrix unit 28 comprises a plurality of elements 30 that are operation units, with these elements 30 being arranged in an array or matrix so as to form four lines in the vertical direction. Between these elements 30, the matrix unit 28 also comprises row wiring sets 51 that extend in the horizontal direction and column wiring sets 52 that extend in the vertical direction. The column wire sets 52 include a pair of wire sets 52x and 52y that are composed of the wires in the column direction on the left and right sides, respectively, of the operation units 30, with data being supplied to the individual elements 30 by these wire sets 52x and 52y.

Switching units 55 are disposed at intersections between the row wire sets 51 and the column wire sets 52, with each switching unit 55 being able to switch and connect any of the channels of the row wire set 51 to any of the channels of a column wire set 52. Each switching unit 55 comprises a configuration RAM that stores settings, and by having the content of the configuration RAM rewritten according to data supplied from the processor unit 11, the connections between the row wire set 51 and the column wire set 52 can be dynamically controlled as desired. Accordingly, in the matrix unit 28 of the present embodiment, a configuration of at least one data flow that is formed of all or parts of the plurality of elements 30 by connecting the wire sets 51 and 52 can be dynamically changed as desired.

Each element 30 comprises a pair of selectors 31 that respectively select input data from the pair of column wire sets 52x and 52y and an internal data path 32 that performs a specified arithmetic and/or logical operation process on the selected input data "dix" and "diy" and outputs output data "do" to the row wire set 51. Elements 30 with internal data paths that execute different processes are arranged on different rows in the matrix unit 28 of the present embodiment. The row wire sets 51 and column wire sets 52 also comprise wires for transferring carry signals. The carry signals can be used as signals that show a carry or as signals that show true or false, and in the matrix unit 28, these carry signals are used for controlling the arithmetic operations and logic operations of each element 30 and for transferring results to other elements 30.

First, the elements 30 that are arranged on the first row comprise data path units 32i that are suited to processing that receives data from the input buffer 26. If these data bus units ("LD") 32i for load operations simply receive an input of data, logic gates are not required, and data is simply received via the load bus 22 and is outputted to the row wire set 51. In the matrix unit 28, the data path units 32i for load operations each have a function for stopping the processing of the data flow to which the element 30 including this data path unit 32i is connected when the stop signal 62 is received from the RAM arbitrating unit 85 of the input RAM 26. Also, the data path units 32i for load operations also each have a function for outputting the stop signal 64 to the arbitrating unit 85 of the corresponding input RAM 26 when the data flow to which the element 30 including the data path unit 32i is connected stops due to an internal factor in the matrix unit 28 or an output-side factor.

Figure 4:
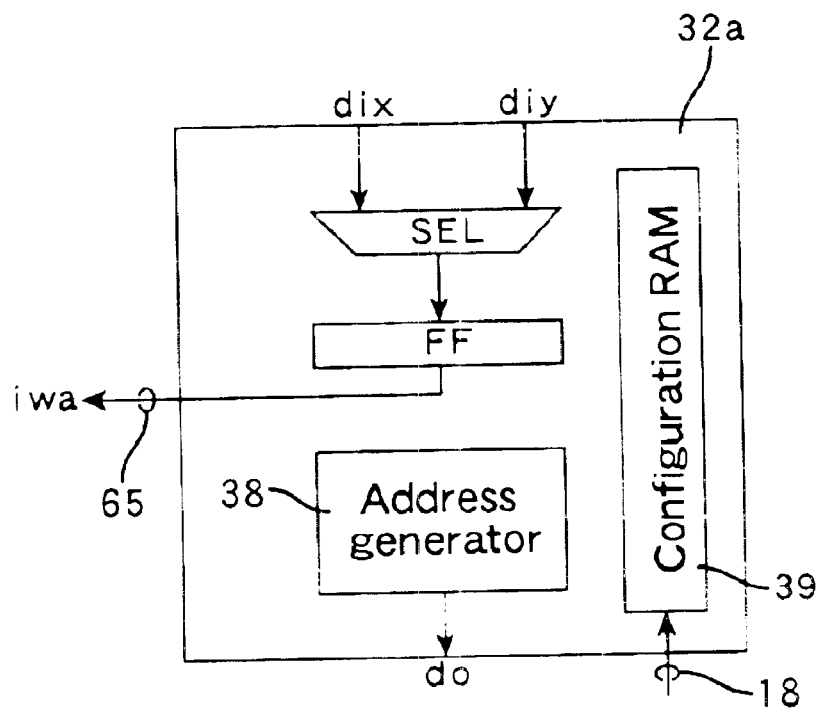
FIG. 4 shows an example of a data path potion that is suited to processing that outputs addresses.

The elements 30a that are arranged on the second row are elements for writing data from the external RAM 2 into the input RAMs 26a to 26d of the input buffer 26, and correspond to the second address outputting sections. Accordingly, these elements 30 each comprise a data path portion or unit 32a with an internal data path that is suited to generating an address (second address) for block loading. Such data path units 32a are called BLAs (Background Load Address Generators). FIG. 4 shows an example of the data path unit 32a that comprises an address generator 38 composed of a counter, etc., with an address being outputted from this address generator 38 as the output signal "do". The output signal "do" is supplied via the row wire set 51 and the column wire set 52 as it is or after processing by other elements 30 to a data path unit 32 as the input signal "dix" or "diy", one of the supplied addresses is selected by a selector "SEL", and outputted via a flip-flop "FF" from the matrix unit 28 to the external access arbitrating unit 25 as the input write address data 65.

Like all of the elements 30 that compose the matrix unit 28, the elements 30 that generate these addresses comprise a configuration RAM 39 for setting conditions of an address generator 38 and selector SEL. The data in the configuration RAM 39 is set by a control signal 18 from the basic processor 11.

Figure 5:
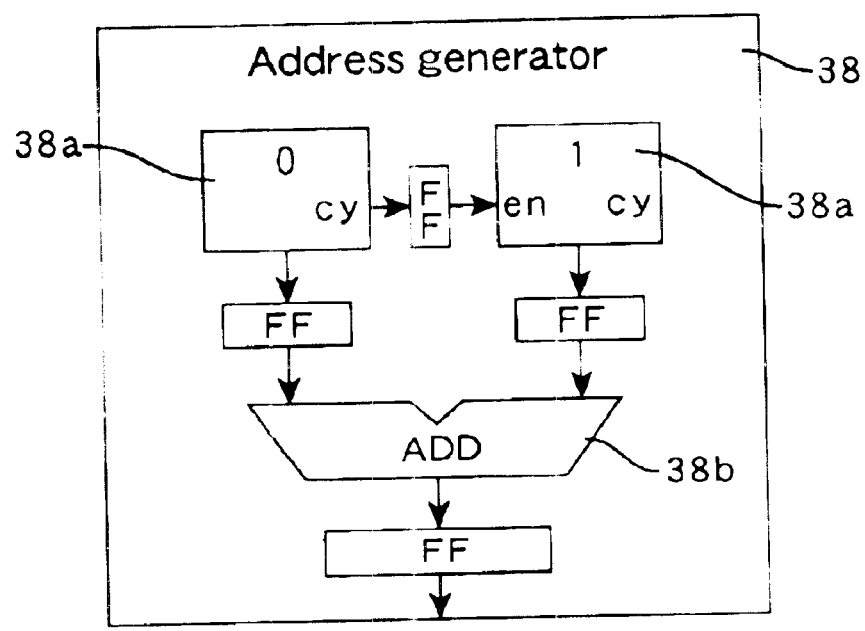
FIG. 5 is a diagram showing the construction of the address generator of the data path portion shown in FIG. 4.
Figure 6:
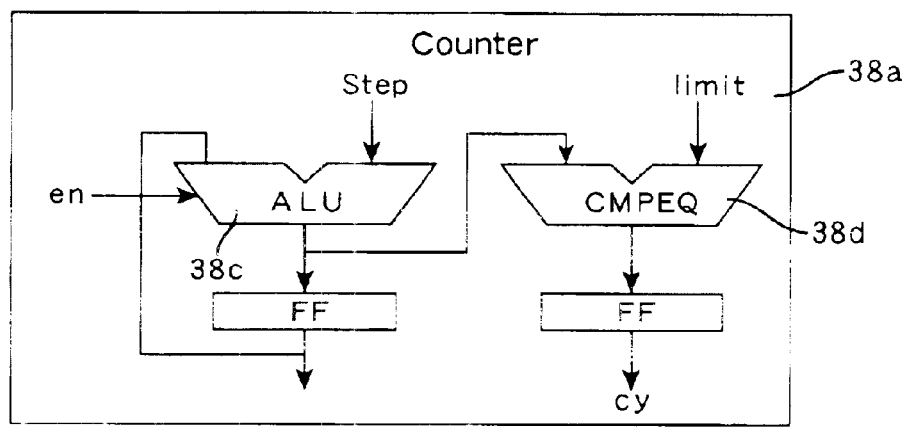
FIG. 6 is a diagram showing the construction of the counter shown in FIG. 5.

FIG. 5 shows one example of the address generating circuit 38. This address generator 38 comprises a plurality of counters 38a and an adder 38b that performs some operations on the outputs of these counters 38a and outputs the result as an address. As shown in FIG. 6, each of the counters 38a comprises a combination of an arithmetic logic unit ALU 38c and a comparator 38d, with it being possible to set an ADD, SUB, bit shift, OR, XOR, or a combination of these operations in the ALU 38c. The counters 38a each have a function as a function generating circuit that generates a value every time the clock signal rises. The functions of the counters 38a can be set by the processor unit 11 via the configuration RAM 39.

The control signal "en" of the ALU 38c can be set by a carry signal "cy" supplied from another counter 38a and the output of the comparator 38d can be transmitted to another counter 38a as the carry signal "cy". By using the carry signal in this way, the state of another counter 38a can be set according to the state of a counter 38a and a desired address can be generated. Also, though not shown in the drawing, the control signal "en" of the counter 38a can be set according to the carry signal "cy" supplied from another element 30 and can be transmitted to another element 30.

The element (BLA) 30a that outputs the input write address data 65 has a construction of the data path unit 32a including an address generating circuit 38 that is suited to the generation of addresses, with it being possible to control the processing content of the address generation from the processor 11 via the configuration RAM 39. It is also possible to freely set how the element (BLA) 30a is related to the other elements 30. The plurality of counters 38a that are included in the BLA 32a are 32-bit counters, for example, and can generate an address for DMA transfer from the external memory 2 to the input RAMs 26a to 26b that are local store buffers.

The elements 30b arranged on the third row in FIG. 3 comprise data path units 32b that generate input readout addresses 61 for loading desired data from each of the input RAMs 26a to 26d into the matrix unit 28, and correspond to the first address outputting sections. The data path unit 32b is called an LDA (Load Address Generator). The construction of these data path units 32b is fundamentally the same as the construction of the data path units 32a described above that generate addresses, except that the data path units 32b output 16-bit addresses, not 32-bit addresses like the data path units 32a. Accordingly, the fundamental configuration of the data path units 32b is as shown in FIG. 4.

Figure 7:
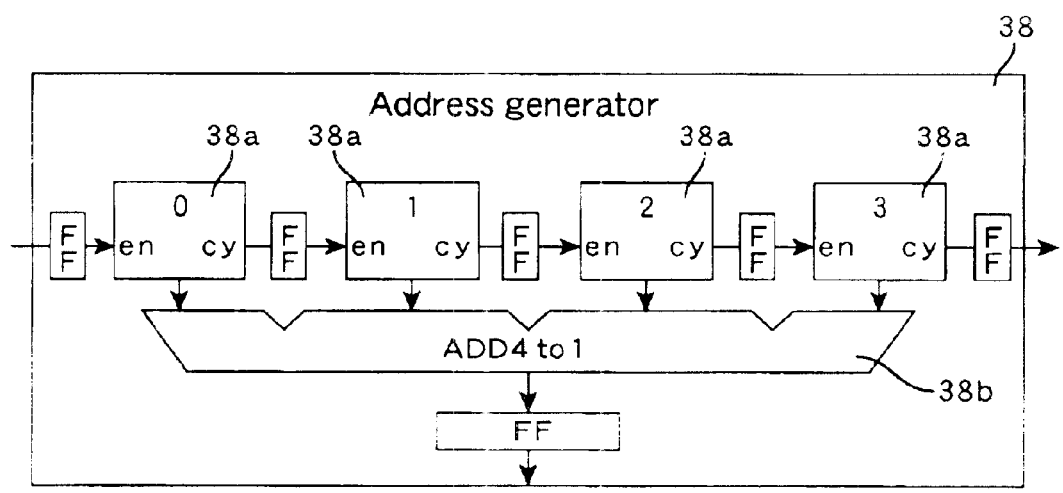
FIG. 7 is a diagram showing an arrangement of a different address generator to FIG. 5.

One example of the address generating circuit 38 included in each LDA 32b is shown in FIG. 7. This address generator 38 comprises four 16-bit counters 38a and generates an address for transferring data from the input RAMs 26a to 26b, which are the local store buffers, to the matrix unit 28. The control signal "en" of the counter 38a can be set by the carry signal "cy" supplied from another element 30 and is constructed so that the control signal "en" can be transmitted to another element 30. Data is supplied from the input RAMs 26a to 26d to the matrix unit 28 according to the input readout address data 61 outputted from this element 30, with this data being processed in some operations performed by another logic or operation element that composes the matrix unit 28.

The elements 30c that are arranged on the fourth and fifth rows comprise data path units ("SMA") 32c that are suited to arithmetic operations and logic operations. As one example, these data path units 32c comprise a shift circuit, a mask circuit, an ALU and a configuration RAM 39 for setting the operation to be executed by the ALU. Accordingly, the input data "dix" and "diy" can be subjected to operations such as addition, subtraction, a comparison, a logical AND or a logical OR according to an instruction written by the processor 11, with the result being outputted as the output data "do".

The elements 30d that are arranged on the next row down comprise data path units ("DEL") 32d that are suited to processing that delays the timing at which data is transferred. As one example, a data path composed of a combination of a plurality of selectors and flip-flop FFs is provided in these data path units 32d, and by having the input data "dix" and "diy" take a path that is selected by the selectors according to the data in the configuration RAM 39, the input data "dix" and "diy" are delayed by a desired number of clocks and then outputted as output signals "dox" and "doy".

The elements 30e that are arranged on the next row down comprise data path units ("MUL") 32e that comprise multipliers or the like and are suited to multiplication. Elements that comprise data path units 32f for an interface with the FPGA unit 14 that is provided on the outside of the matrix unit 28 are also provided as another kind or type of elements 30f, with these elements 30f being able to continuously perform processing that supplies data to the FPGA unit 14 and returns the data to the matrix unit 28 after processing.

Elements 30g and 30h that respectively comprise data path units 32g and 32h that are suited to generating store addresses are arranged further below the region correspond to the data processing section in which the above types of elements are arranged. These data path units 32g and 32h have fundamentally the same construction as the data path units 32b and 32a respectively that generate addresses and were described above with reference to FIGS. 4 to 7. The elements 30g that comprise the data path units 32g are the first address outputting sections and output the output write addresses 71 for writing data outputted from the matrix unit 28 into the output RAMs 27a to 27d. Therefore, the data outputted from the data processing systems using the various types of elements 30c to 30f that are described above is written into the output RAMs 27a to 27d. Each data path unit 32g is called an STA (Store Address Generator) and has the same configuration as the LDA 32b.

The elements 30h that comprise the data path units 32h and are arranged below these elements (STA) 30g are the second address outputting sections and output the output readout addresses 75 for reading out data from the output RAMs 27a to 27d and writing data into the external RAM 2 so that data processed by the matrix unit 28 is written into the external RAM 2. Each data path unit 32h is called a BSA (Background Store Address Generator) and has the same construction as the BLA 32a.

Elements 30 comprising data path units 32s that are suited to the outputting of data for storing are arranged on the final row. These data path units 32s are called "ST", with it being possible to use data path units with almost the same construction as the data path units 32c for arithmetic operations. Also, in the present embodiment, each data path unit 32s for outputting is provided with a function for stopping the processing of the data flow that is connected to the element 30 including the data path unit 32s when a stop signal 74 is received from the arbitrating unit 85 of the output RAM 27.

In this way, the matrix unit 28 of the present embodiment comprises elements 30a with internal data paths (BLA) 32a that generate addresses for inputs (block loads) of data from the external RAM 2 into the input RAMs 26a to 26d and elements 30b with internal data paths (LDA) 32b that generate addresses for inputs of data into the matrix unit 28 from these input RAMs 26a to 26d. The matrix unit 28 also comprises elements 30g with internal data paths (STA) 32g that generate addresses for outputs of data from the matrix unit 28 to the output RAMs 27a to 27d and elements 30h with internal data paths (BSA) 32h that generate addresses for outputs (block loads) of data in the output RAMs 27a to 27d to the external RAM 2. These elements 30a, 30b, 30g, and 30h each have a data path that is suited to the generation of the addresses mentioned above, with it being possible to change the configurations and functions of the data path by rewriting the data in the configuration RAM 39. The connections with the other elements 30 in the matrix unit 28 can also be changeable by changing the connections of the row wire sets 51 and the column wire sets 52. Accordingly, data for address generation can be provided from the processor 11 and/or from other elements 30 in the matrix unit 28 and the timing at which addresses are generated can be flexibly controlled.

In this way, according to a variety of conditions and/or constructions, data can be loaded from the external RAM 2 and input RAMs 26a to 26d that are used as caches. Separate to this processing, data can also be loaded into the matrix unit 28 asynchronously and/or independently from the input RAMs 26a to 26d according to different conditions. In addition, the elements 30a and 30b are independent, so that such processing can be executed in parallel. Accordingly, the plurality of input RAMs 26a to 26d are storage sections where inputting and outputting can be performed independently.

Since each of the input RAMs 26a to 26d has a dual-bank configuration, inputting and outputting can be performed in parallel for each of the input RAMs 26a to 26d, so that with this configuration, the inputting and outputting of data into and out of each of the input RAMs 26a to 26d can be performed extremely efficiently. This is also the case for each of the output RAMs 27a to 27d, those are also storage sections where inputting and outputting can be performed independently, and inputting and outputting into and from each of the output RAMs 27a to 27d can be performed independently and in parallel. Accordingly, in this system, inputs and outputs of data can be performed extremely efficiently for the RAMs 26a to 26d and 27a to 27d that operate as caches.

The matrix unit 28 of the present embodiment comprises the elements 30a, 30b, 30g, and 30h with the data path units 32a, 32b, 32g, and 32h that are fundamentally suited to the generation of addresses, with the operations of these elements being determined according to instructions from the basic processor 11. This is to say, according to instructions that are supplied via the control bus 18 from the basic processor 11, which is the control unit, the circuit for accessing the RAMs 26a to 26d and 27a to 27d, which are the first memory, is determined and the circuit for accessing the DRAM that is the main memory (the second memory) is also determined.

In addition, a circuit for controlling the accesses to these memories is configured in the matrix, so that it is extremely easy to directly or indirectly reflect the conditions on the inside of the matrix unit 28, for example, the configuration of the data flows, the processing results of the data flows, and also the results of processing that uses other elements of the matrix unit 28, in the operation of these circuits. The elements 30a, 30b, 30g, and 30h are not only suited to the generation of addresses but also be freely wired to other elements in the matrix unit 28 by the wires 51 and 52 in the same way as the other elements. For this reason, the outputs from the elements 30a, 30b, 30g, and 30h can be controlled by changing the parameters and/or the processing content of the elements 30a, 30b, 30g, and the 30h according to a data flow or data flows that are configured by the other elements that form the data processing section in the matrix unit 28 and/or the software that is executed by the data processing section. By constructing a data flow using the other element in addition to the elements 30a, 30b, 30g, and 30h, the functions of the other elements can also be used for generating addresses. Therefore, the access method for accessing the RAMs 26a to 26d and 27a to 27d that are the first memory that composes the cache system and the access method for accessing the DRAM 2 that is the main memory (second memory) can be flexibly determined according to conditions on the inside of the matrix unit 28, for example, the construction of the data flows and the processing results.

The matrix unit 28 is reconfigurable according to control from the basic processor 11, so that the internal data paths and functions of the elements 30a, 30b, 30g, and 30h that generate addresses can also be dynamically reconfigurable and the connections with other elements can also be dynamically reconstructed. It is also possible to provide the function for instructing reconfiguration of the connections within elements or between elements on the inside of the matrix unit 28. When the configurations of data flows or data paths are rearranged by changing the connections with the other elements 30 in the matrix unit 28 according to the processing content executed by the matrix unit 28, it is also possible to change the configurations that input and output data into and out of the buffer 26 composed of the input RAM and the buffer 27 composed of the output RAM.

For this reason, it is possible to use a configurtion that is optimally suited to the processing executed by the matrix unit 28 for the cache system that inputs and outputs data to and from the input buffer 26 and the output buffer 27, so that the hit rate of the cache can be raised, and the frequency of rewrites of data in the cache can be reduced. It is also possible to reconfigure the insides of the elements 30a, 30b, 30g, and 30h that generate addresses and the data paths related to these elements on an element-by-element basis and to rearrange the cache system separately for each of the RAMs 26a to 26d and 27a to 27d. This makes the present invention extremely flexible. Accordingly, before a data processing system or systems are configured in the matrix unit 28 from the other elements 30, it is possible to realize a data input configuration that is suited to the data processing system to be configured and commence data loads. On the other hand, after the data processing system has been reconfigured for other processing, the data outputting configuration can be maintained for outputting continuously the data processed by the data processing system that has been already reconfigured. In this way, processing that was inconceivable with conventional techniques can be executed with great flexibility. This is to say, the processing performed for the RAMs 26 and 27 that are the first memory and the DRAM 2 that is the second memory can be executed as desired independently of other elements and data flows or alternatively as part of the processing of other elements or data flows. It is also possible to make the elements 30a, 30b, 30g, and 30h that generate addresses to operate relationally or cooperatively, to make a plurality of elements 30a and/or 30b operate relationally or cooperatively, and to have the matrix unit 28 use the plurality of RAMs 26 as a single high-capacity cache.

Also, it is possible for the element 30a to perform a process that outputs the input write address 65 and writes data from the RAM 2 when the input RAM 26a becomes empty, while the element 30b performs a process that loads data into the matrix unit 28 when there is data in the RAM 26a. The elements 30a and 30b can be made to operate independently and in parallel, so that data in the external RAM 2 can be prefetched into the input RAM 26a without wasting the processing time of the data processing system. If the element 30a controls the address at which data is inputted from the external RAM 2, the processing in a data processing system composed of the element 30b and the matrix unit 28 can proceed with only an address in the internal RAM 26a. If a data flow-type processing system is defined using a plurality of other elements 30 in the matrix unit 28, data processing can proceeded in the matrix unit 28 with only the data and without using an address.

It is also possible to configure a system in which a virtual address is outputted from a data processing system in the matrix unit 28 and the element 30b converts this virtual address into a physical address in the input RAM 26a and supplies data, with the element 30a converting the virtual or physical address into a physical address in the external RAM 2 and loading the data from the external RAM 2 when the data is not in the input RAM 26a.

It is also possible to configure a system where the element (BLA) 30a generates an address from data inputted from the input RAM 26b, with this address being used to load data from the external RAM 2 into the input RAM 26a. Accordingly, completely indirect addressing control can be performed by merely the mechanism that performs inputs and outputs for the input RAM 26 and the output RAM 27 independently of the data processing system constructed in the matrix unit 28. It is also possible to realize a multilevel cache system by linking the operations of the plurality of input RAMs 26a to 26d, the output RAMs 27a to 27d, and also the access arbitrating unit 25.

The AAP 20 of the present embodiment is provided with four input RAMs 26a to 26d and four output RAMs 27a to 27d that correspond to the elements 30 that are arranged in four columns. Accordingly, the input RAMs 26a to 26d and the output RAMs 27a to 27d can be used as individual cache memories that respectively correspond to the plurality of data processing systems configured with the other kinds elements 30 in the matrix unit 28. When a plurality of jobs and/or applications are executed by the matrix unit 28, the input RAMs 26a to 26d and the output RAMs 27a to 27d can be used separately as optimal caches for these jobs and/or applications. The elements 30 are arranged in four columns, though the data processing systems configured with these types of elements 30 are not limited to four. If three or fewer data processing systems are configured in the matrix unit 28, the capacity of the cache memory used by one data processing system can be increased by assigning a plurality of RAMs out of the input RAMs 26a to 26d and the output RAMs 27a to 27d to one data processing system. When there are five or more data processing systems are configured, one RAM is assigned to a plurality of data processing systems as a cache memory. In this case, at the worst, the same condition may be occurred as cache processing for multitasking that is performed in a modern CPU of data processing system that shares a RAM.

Figure 8:
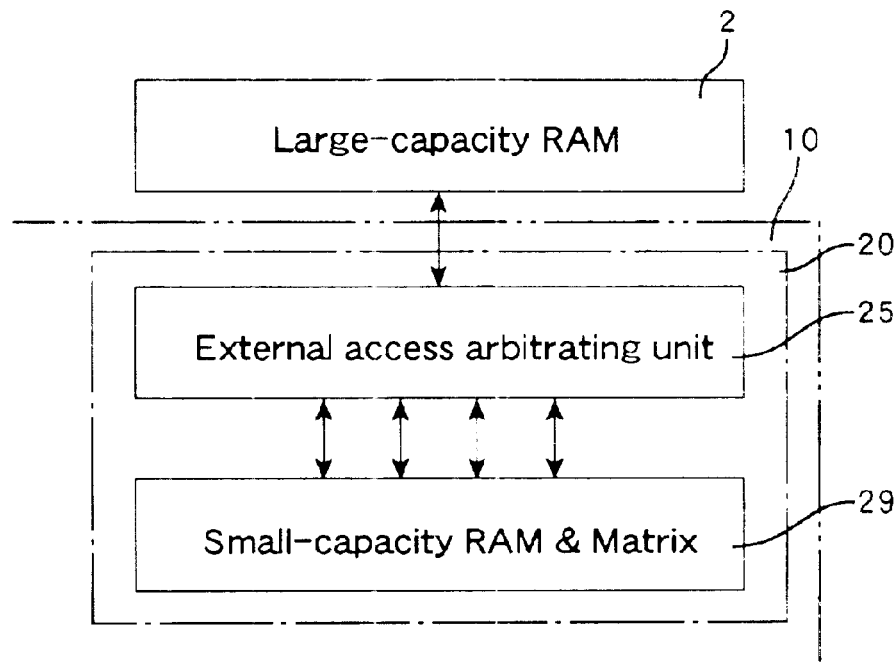
FIG. 8 is a diagram showing how a large-capacity RAM is controlled as an external memory.

As shown in outline in FIG. 8, a system LSI 10 that is the integrated circuit device or processing device of the present invention comprises a configuration or assembly 29 including a matrix portion or part that is the processing unit and a small-capacity RAM, with addresses that are outputted to the external RAM 2 from the matrix part being supplied to the external RAM 2 via the arbitrating unit 25. An address generating mechanism that controls the inputting and outputting of data into and out of the small-capacity RAM is realized by the matrix port where data flows can be reconfigured, so that the architecture that controls the small-capacity RAM that functions as a cache memory can also be reconfigured and so can be changed to an optimal construction for the software executed by the matrix unit. Accordingly, with the system LSI 10 that is the integrated circuit device or processing device of the present invention, the small-capacity RAM can be used as a cache memory in the most efficient manner for the hardware environment and the processing content of the software that is to be executed. For a variety of software programs are executed, a cache memory and a circuit for controlling this cache memory can be configured so that a higher hit rate is obtained. Accordingly, it is possible to provide an integrated circuit device or processing device (system LSI or ASIC) in which no overloads are caused by inputs into and outputs from the cache memory for a variety of software is executed.

Figure 9:
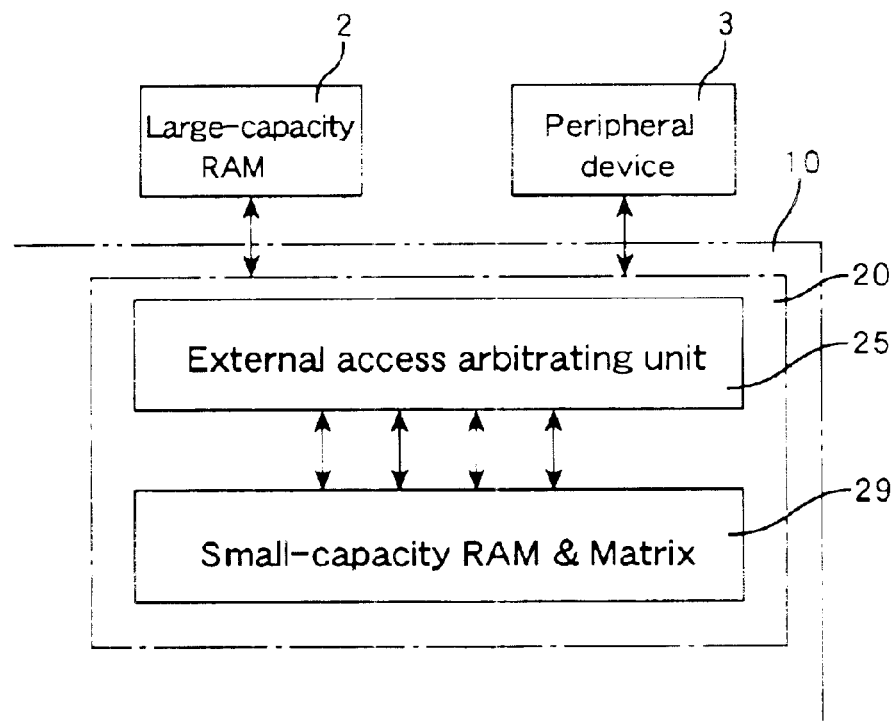
FIG. 9 is a diagram showing how a large-capacity RAM and a peripheral device are controlled as an external memory.

The external memory that can be controlled by the system LSI 10, that is the second memory, is not limited to RAM. The device used as the external memory for the input RAM and/or the output RAM is not limited to a storage device such as a RAM, ROM, or even a hard disk drive, and includes any device that can input or output data when an address is indicated. As one example, as shown in FIG. 9, when the LSI 10 controls a large-capacity RAM 2 and a peripheral device 3, such as a printer or a display, as an external memory, the elements BLA 30a and BSA 30h that perform block loads for the matrix unit 28 may generate physical addresses that are assigned to the peripheral device 3.

Figure 10:
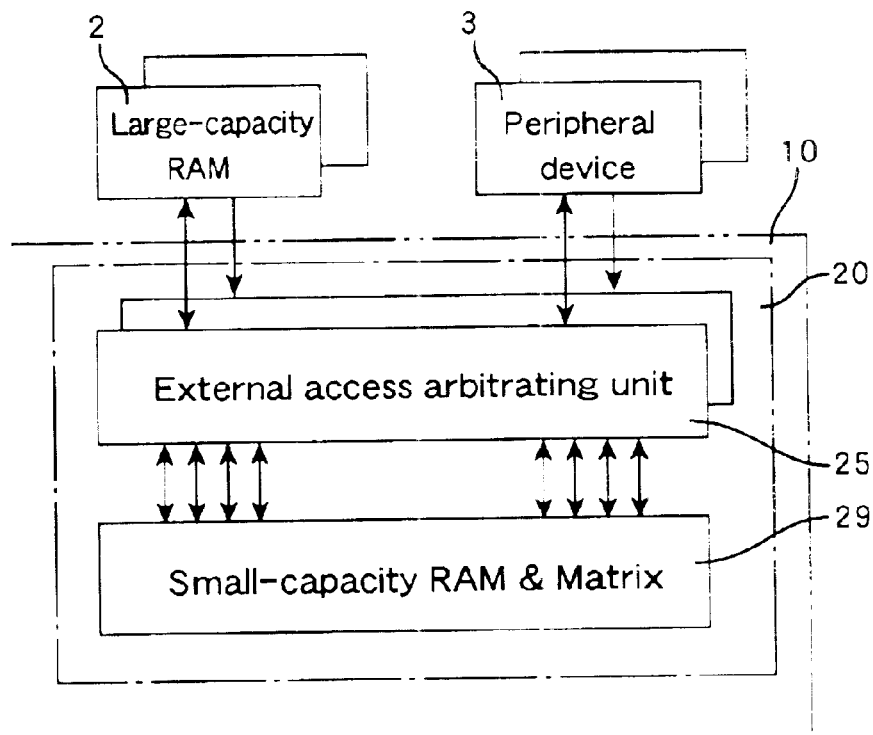
FIG. 10 is a diagram showing how a plurality of large-capacity RAMs and peripheral devices are controlled as an external memory.

Also, as shown in FIG. 10, it is possible to provide the LSI 10 that controls a plurality of large-capacity RAMs 2 and peripheral devices 3 via a plurality of bus controllers. In this case, modifications, such as the provision of a plurality of arbitrating units 25, may be applied. Also, a large-capacity RAM 2 may be implemented inside the LSI 10, and it is also possible to use a construction where the large-capacity RAM 2 is used as a cache memory for the peripheral devices 3. The large-capacity RAM 2 may also be used as a code RAM of the processor 11.

The above explanation describes one example of the construction of the matrix unit or part 28, though the present invention is not limited to this construction. In the above description, operation elements that include the special-purpose data paths 32 suited to special-purpose processing such as address generation, arithmetic operations, logic operations, multiplications, and delays are described as the elements with, though the functions of the data paths and their configurations are not limited to the examples given above. By arranging elements including data paths with some functions that are suited to the applications executed by the LSI 10, which is the integrated circuit device or data processing device of the present invention, in a matrix or in an array, it is possible to provide a processing unit in which data flows can be changed or reconfigured. A plurality of matrix units 28 may be implemented or arranged, with the plurality of matrix units being arranged on the same plane or in three dimensions, so that an integrated circuit device comprising an even larger number of elements can be constructed. Also, the integrated circuit device of the present invention is not limited to an electronic circuit and can be adapted to an optical circuit or an optoelectronic circuit.

While the present invention is described above by means of an example in which an AAP 20, a basic processor 11, and a bus control unit 15 are incorporated in a system LSI 10, the range of the components to be provided as a single chip depends on conditions such as the applications to be implemented. The AAP 20 may also be provided as a single chip, or alternatively the part 29 that includes the RAMs 26 and 27, which form the cache, and the matrix unit 28 may be packaged into a single chip. It is also possible to provide a larger system LSI or ASIC comprising a plurality of AAP units or other special purpose circuits in addition to the basic processor 11.

Figure 11:
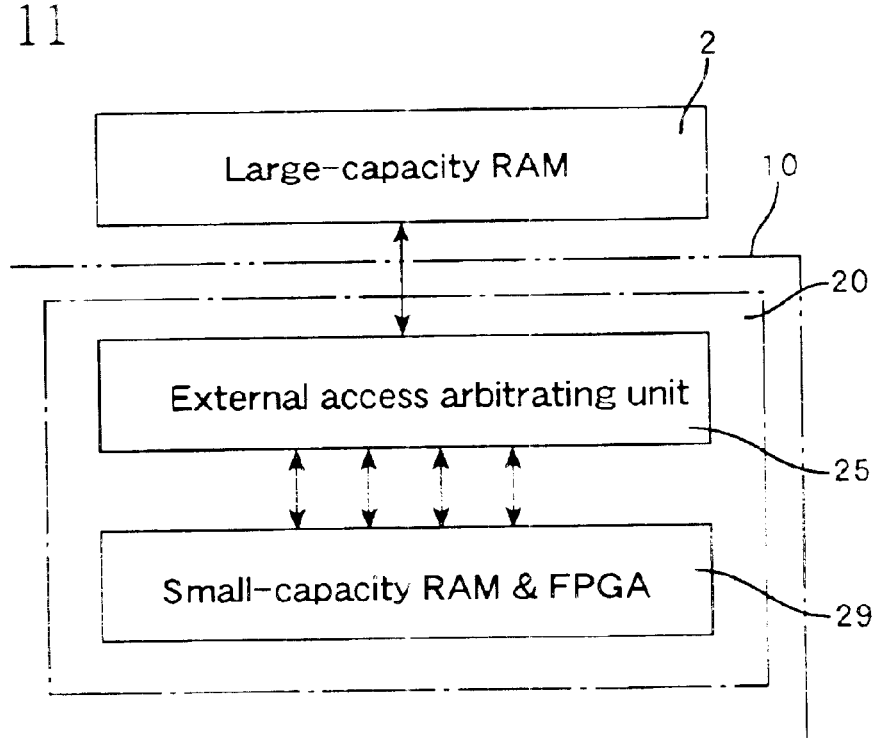
FIG. 11 is a diagram showing how a large-capacity RAM is controlled as an external memory by a different integrated circuit device according to the present invention.

As shown in FIG. 11, the integrated circuit device or processing device of the present invention can also be realized by using an FPGA as a processing unit in place of the matrix unit 28 and, in the FPGA, in addition to the data processing section, the first and second address outputting sections of the present invention can be programmed or mapped for using the input RAMs 26 and the output RAMs 27 as caches. An FPGA is an architecture where the configuration of data paths that have wide applicability can be changed at the transistor level. Research is also being performed into integrated circuit devices where the data paths or data flows can be reconfigured using medium-scale basic functional units that are of the same construction, the basic functional units consisting the same kinds of elements (though not at the transistor level) but executing various processes according to an instruction set. In a processing unit having this kind of architecture, the integrated circuit device and processing device of the present invention can also be realized by configuring (or indicating the configuration of), in addition to a data processing section, a first and second address outputting section that have the input RAM 26 and the output RAM 27 function as caches.

Unlike the architecture where basic units of the same construction are aligned, an architecture based on the matrix unit described above comprises a plurality of types of elements, each type of element including different internal data paths. Since this is not an architecture that needs to have wide applicability on a transistor level, the packing density can be raised and a compact, economical system can be provided. Also, since each of the elements 30 comprises a data path unit 32 that is dedicated to special-purpose processing, a large reduction can be made in the redundancy in the construction. Compared to an FPGA or another processing unit in which basic processing units of the same construction are arranged, a large increase can be made in processing speed and the AC characteristics can also be improved. Also, since space is used more efficiently, a compact layout can be used, and the lengths of the wires can also be reduced. Accordingly, the architecture including matrix is suited to an integrated circuit device or processing device that makes full use of the efficient cache construction disclosed by the present invention that makes possible to provide a low-cost processing device with higher-speed processing.

Furthermore, unlike an FPGA where circuits are mapped at the transistor level, i changing the combination of elements 30 that include the data path units 32 which are suited in advance to special-purpose processing has the merit that configurations and functions of the data processing units, that is the data processing systems configured in the matrix unit 28, can be changed in a short time that in most cases is one clock. Also, in each element 30, the functions of the selectors and logic gates, such as the ALU, that compose the data path unit 32 can be set independently by the processor 11 via the configuration memory 39, so that the data path unit 32 of each element 30 can be flexibly changed within the range of functions that the data path unit is serviced. Accordingly, in the matrix unit 28 of the present embodiment, the range of functioning that can be executed by data flow-type data processing is extremely wide. It is also possible to select and arrange suitable types of operation units 30 for the application, such as network processing or image processing, for which the LSI 10 is to be used, which makes it possible to provide an integrated circuit device with even higher mounting efficiency and processing speed.

As described above, the present invention forms the first address outputting section and second address outputting section that control a first memory which can be used as a cache memory in a processing unit in which the data flows are changeable. This means that the configuration of the cache system can be dynamically reconfigured to an optimal configuration for the configuration of the data processing section and the software that is executed by the data processing section. When a variety of software is executed, a cache system with a higher hit ratio can be constructed. Accordingly, it is possible to provide an integrated circuit device that executes a variety of software or applications in a shorter processing time.

Industrial Applicability

The processing unit and integrated circuit device of the present invention can be provided as a system LSI, an ASIC, or the like that can execute a variety of data processing. The processing unit and integrated circuit device of the present invention are not limited to electronic circuits, and may be adapted to optical circuits or optoelectronic circuits. The integrated circuit device of the present invention can execute data processing at high speed using hardware that can be reconfigured, and so is suitable for a data processing device that performs processing, such as network processing and image processing, where high-speed and real-time processing is required.

What is claimed is:

1. An integrated circuit device, comprising:
   a first memory that for inputting data into and/or outputting data from a second memory; and
   a processing unit in which at least one data flow is formed and in which at least part of the at least one data flow is reconfigurable, wherein the processing unit includes:
   a data processing section that processes data that is inputted from and/or outputted to the first memory;
   a first address outputting section that outputs a first address of data that is inputted and/or outputted between the first memory and the data processing section; and
   a second address outputting section that outputs a second address of data that is inputted and/or outputted between the first memory and the second memory, and
   wherein an accessing for the first memory and/or the second memory is determined by reconfiguring at least a part of a dataflow relating to the first address outputting section and/or the second address outputting section according to configuration of data flows configured in the data processing section or processing results of the data flows.

2. An integrated circuit device according to claim 1, wherein the first address is an address in the first memory and the second address is an address in the second memory.

3. An integrated circuit device according to claim 1, wherein by reconfiguring at least a part of a dataflow relating to the first address outputting section and the second address outputting section, a configuration in that the second address outputting section and the first address outputting section operate cooperatively and a configuration in that the second address outputting section and the first address outputting section operate independently are selectable.

4. An integrated circuit device according to claim 1, wherein the first memory includes a plurality of storing sections that are capable of independent inputs and outputs.

5. An integrated circuit device according to claim 1, wherein the first memory includes a first input memory that stores data that is to be inputted into the data processing section and a first output memory that stores data that has been outputted from the data processing section.

6. An integrated circuit device according to claim 1, further comprising a first arbitrating unit that manages inputs and/or outputs between the first memory and the data processing section.

7. An integrated circuit device according to claim 6, wherein the first arbitrating unit has a function that outputs a stop signal to the data processing section when conditions for an input to or an output from the data processing unit are not satisfied.

8. An integrated circuit device according to claim 7, wherein the data processing section has a function that stops, according to the stop signal, processing of the at least one data flow that is formed in the data processing section.

9. An integrated circuit device according to claim 6, wherein the first memory includes a first input memory that stores data that is to be inputted into the data processing section and a first output memory that stores data that has been outputted from the data processing section, and the first arbitrating unit includes a first input arbitrating unit that manages data transfers from the first input memory to the data processing section and a first output arbitrating unit that manages data transfers from the data processing section to the first output memory.

10. An integrated circuit device according to claim 6, wherein the first memory includes a plurality of storing sections that are capable of independent inputs and outputs, and the first arbitrating unit has a function that manages the plurality of storing sections independently.

11. An integrated circuit device according to claim 6, wherein the first memory includes a plurality of storing sections that are capable of independent inputs and outputs, and the first arbitrating unit has a function that manages the plurality of storing sections relationally.

12. An integrated circuit device according to claim 1, wherein in the data processing section, a plurality of data flows are able to be configured, the integrated circuit device comprises a plurality of first memories, and the first address outputting section and the second address outputting section are configured in the processing unit respectively corresponding to each of the plurality of first memories.

13. An integrated circuit device according to claim 12, further comprising a second arbitrating unit that manages inputs and outputs between the second memory and the plurality of first memories, wherein the second address is supplied to the second arbitrating unit.

14. An integrated circuit device according to claim 1, wherein the processing unit includes a plurality of logic elements of a same type whose functions are changeable and a set of wires that connect the logic elements.

15. An integrated circuit device according to claim 1, wherein the processing unit includes a plurality of types of special-purpose processing elements, each type of the plurality of types of special-purpose processing element including internal data path suite to different special-purpose processing, and a set of wires that connect the special-purpose processing elements.

16. An integrated circuit device according to claim 15, wherein the processing unit includes a type of special-purpose processing element with internal data path suite to outputting addresses.

17. An integrated circuit device according to claim 15, wherein the special-purpose processing elements include means for selecting part of the internal data path and a configuration memory that stores a selection in the internal data path.

18. An integrated circuit device according to claim 17, further comprising a control unit that rewrites a content of the configuration memory.

19. An integrated circuit device according to claim 1, further comprising a control unit that indicates a change to at least part of the at least one data flows of the processing unit.

20. An integrated circuit device according to claim 19, wherein the control unit is capable of indicating changes to the at least one data flow of the data processing section, the first address outputting section, or the second address outputting section independently.

21. An integrated circuit device according to claim 19, further comprising a code memory that stores program code that controls the control unit.

22. An integrated circuit device according to claim 1, further comprising: the second memory that is capable of inputting data into and/or outputting data out of a third memory; and a third address outputting means for outputting a third address of data that is inputted and/or outputted between the third memory and the second memory.

23. An integrated circuit device, comprising:

a first memory that for inputting data into and/or outputting data from a second memory;

a processing unit in which at least one data flow, which processes data that is inputted into or outputted from the first memory, is configured; and a first arbitrating unit that manages inputs and/or outputs between the first memory and the processing unit, wherein the first arbitrating unit has a function for outputting a stop signal to the date processing unit when conditions for an input to or an output from the processing unit are not satisfied, and the processing unit has a function that stops processing of the at least one data flow according to the stop signal.

24. An integrated circuit device according to claim 23, wherein at least part of the at least one data flow can be changed in the processing unit.

25. An integrated circuit device according to claim 23, wherein the first memory includes a first input memory that stores data that is to be inputted into the processing unit and a first output memory that stores data that has been outputted from the processing unit, and the first arbitrating unit includes a first input arbitrating unit that manages data transfers from the first input memory to the processing unit and a first output arbitrating unit that manages data transfers from the processing unit to the first output memory.

26. An integrated circuit device according to claim 23, wherein the first memory includes a plurality of storing sections that are capable of independent inputs and outputs, and the first arbitrating unit has a function that manages the plurality of storing sections independently.

27. An integrated circuit device according to claim 23, wherein the first memory includes a plurality of storing sections that are capable of independent inputs and outputs, and the first arbitrating unit has a function that manages the plurality of storing sections relationally.

28. A processing unit in which at least one data flow is formed and in which at least part of the at least one data flow is reconfigurable, the processing unit comprising:

a data processing section that processes data that is inputted from and/or outputted to a first memory that is capable of inputting data into and/or outputting data from a second memory;

a first address outputting section that outputs a first address of data that is inputted and/or outputted between the first memory and the data processing section; and a second address outputting section that outputs a second address of data that is inputted and/or outputted between the first memory and the second memory, and wherein an accessing for the first memory and/or the second memory is determined by reconfiguring at least a part of a dataflow relating to the first address outputting section and/or the second address outputting section according to configuration of data flows configured in the data processing section or processing results of the data flows.

29. A processing unit according to claim 28,
wherein by configuring at least a part of a dataflow relating to the first address outputting section and the second address outputting section, a configuration in that the second address outputting section and the first address outputting section operate cooperatively and a configuration in that the second address outputting section and the first address outputting section operate independently are selectable.

30. A processing unit according to claim 28,
wherein in the data processing section, a plurality of data flows are able to be configure, and the processing unit comprises pairs of first and second address outputting sections that respectively correspond to each of a plurality of first memories.

31. A processing unit according to claim 28,
further comprising a plurality of types of special-purpose processing elements, each of the plurality of types of special-purpose processing elements include internal data path suite to different special-purpose processing, and a set of wires that connect the special-purpose processing elements.

32. A processing unit according to claim 31,
further comprising a type of special-purpose processing elements that include an internal data path that is suited to outputting addresses.

33. A processing device, comprising the processing unit according to claim 31 and the first memory.

34. A processing device according to claim 33,
further comprising a control unit that indicates a change to at least part of the at least one data flow in the processing unit.

35. A control method for an integrated circuit device that includes a first memory that is capable of inputting data into and/or outputting data from a second memory and a processing unit in which at least one data flow is formed and in which at least part of the at least one data flow is reconfigurable,
the control method comprising a step of instructing the processing unit to configure a data processing section that processes data that is inputted from and/or outputted to the first memory, a first address outputting section that outputs a first address of data that is inputted and/or outputted between the first memory and the data processing section, and a second address outputting section that outputs a second address of data that is inputted and/or outputted between the first memory and the second memory, and determine an accessing method for the first memory and/or the second memory by reconfiguring at least a part of a dataflow relating to the first address outputting section and/or the second address outputting section according to configuration of data flows configured in the data processing section or processing results of the data flows.

36. A control method according to claim 35,
including in the step of instructing, a step of independently indicating changes to the data flow of the data processing section, the first address outputting section, or the second address outputting section.

37. A control method according to claim 35,
including in the step of instructing, instructing to reconfigure at least a part of a dataflow relating to the first address outputting section and the second address outputting section so as to the second address outputting section and the first address outputting section operate cooperatively, or so as to the second address outputting section and the first address outputting section operate independently.

38. A control method according to claim 35,
wherein a plurality of data flows are configured in the data processing section, and including
in the step of instructing, instructing to form a pair of a first address outputting section and second address outputting section respectively corresponding to each of a plurality of first memories.

39. A control method according to claim 35,
further comprising an executing step of forming the at least one data flow in the data processing section and executing processing that is related to data inputted into and/or outputted from the first memory, and including in the executing step, processing of the at least one data flow formed in the data processing section is stopped using a stop signal that is outputted by a first arbitrating unit, which manages inputs and outputs between the first memory and the data processing section, when conditions for inputting or outputting are not satisfied.

40. A control method for an integrated circuit device that includes a first memory that is capable of inputting data into and/or outputting data from a second memory and a processing unit in which at least one data flow, which processes data that is inputted into or outputted from the first memory, is formed,
the control method comprising an executing step of executing processing related to data that is inputted into and/or outputted out of the first memory, and including
in the executing step, processing of the at least one data flow is stopped according a stop signal that is outputted by a first arbitrating unit, which manages inputs and outputs between the first memory and the data processing section, when conditions for inputting or outputting are not satisfied.

* * * * *

UNITED STATES PATENT AND TRADEMARK OFFICE
CERTIFICATE OF CORRECTION

PATENT NO. : 6,868,017 B2
DATED : March 15, 2005
INVENTOR(S) : Kenji Ikeda

It is certified that error appears in the above-identified patent and that said Letters Patent is hereby corrected as shown below:

Column 22,
Line 20, delete "date".

Signed and Sealed this

Fourth Day of October, 2005

JON W. DUDAS
*Director of the United States Patent and Trademark Office*